Feb. 20, 1962 G. SHAW 3,022,132
APPARATUS AND METHOD FOR ORIENTING AND MIXING
OF SYNTHETIC FIBERS
Filed Feb. 25, 1957
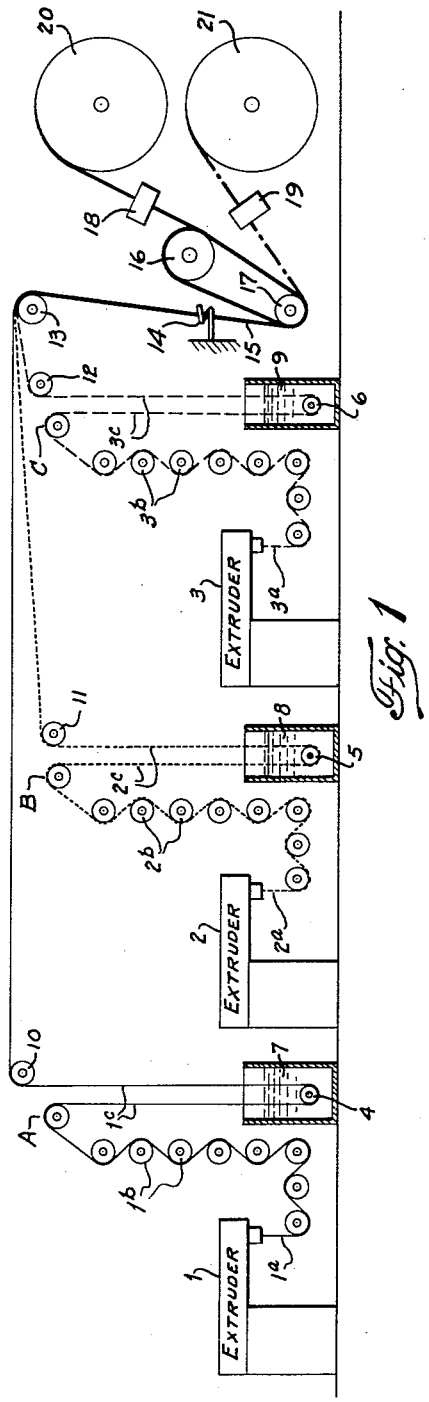
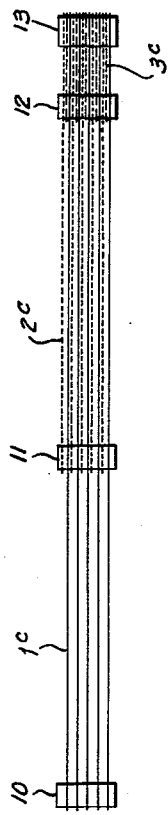
INVENTOR.
GILBERT SHAW
BY
Morgan, Finnegan, Durham & Pine
ATTORNEYS.

United States Patent Office 3,022,132
Patented Feb. 20, 1962

3,022,132
APPARATUS AND METHOD FOR ORIENTING
AND MIXING OF SYNTHETIC FIBERS
Gilbert Shaw, Box 151, Middlebury, Vt.
Filed Feb. 25, 1957, Ser. No. 642,210
1 Claim. (Cl. 18—54)

This invention relates to an apparatus and method for orienting and mixing synthetic fibers or filaments and the like of different kind and nature, such as for example fibers of different color, material, sizes, etc.

At the present in the manufacture of brushes, many brush fibers are supplied in dyed mixed colors. These colored fibers are mixed by taking properly cut lengths of each of the colors and mixing them on mixing machines specially sold for that purpose. The desired total weight is loaded into the machine and is circulated around an endless conveyor belt arrangement while being exposed to a sequence of combs which effect random mixing of the various colors loaded into the machine. Such an arrangement is shown in Baer U.S. Patent 1,601,712, granted October 5, 1926. The same type of mixing machine as described above is used to handle different materials or the same material of different sizes.

Accordingly, the cost of mixed brush fibers is higher than the same weight of uniform brush fibers because of the special handling apparatus and time required for the mixing operation. Thus, the object of this invention is to provide a novel apparatus and method whereby synthetic filaments or fibers of different kind and nature may be oriented and mixed in a simple, quick and economical manner.

Objects and advantages of the invention will be set forth in part hereinafter and in part will be obvious herefrom, or may be learned by practice with the invention, the same being realized and attained by means of the steps, methods, combinations and improvements pointed out in the appended claim.

The invention consists in the novel steps, methods, combinations and improvements herein shown and described.

The accompanying drawings, referred to herein and constituting a part hereof, illustrate one embodiment of the apparatus, and together with the description, serve to explain the principles of the invention.

Of the drawings:

FIG. 1 shows diagrammatically in side elevation one embodiment of an orienting and mixing apparatus according to the invention for carrying out the process; and FIG. 2 is a fragmentary diagrammatic plan view of a portion of the apparatus of FIG. 1.

In general, the apparatus of this invention comprises a multiple extruder unit including a plurality of spaced extruders which are balanced size-wise, or speed-wise if the same size, to give the desired ratio of the components in the mixture produced. From each of the extruders are produced a set of substantially parallel filaments which proceed as a family of substantially parallel filaments until the sets of filaments are mingled before they go on to take-off means, such as a clutch driven take-off reel. In its course of travel from the extruder to the take-off means, means are provided whereby each set of filaments is gradually cooled to its orientation temperature by contacting each set of filaments with a heated moving surface and applying a tensioning force to said filaments while at their orientation temperature. More particularly, each set of filaments is oriented by means described in my copending application Serial No. 402,898, filed January 8, 1954, which issued into U.S. Patent No. 2,900,220. The orienting unit described in this application comprises a plurality of driven heated rollers for gradually cooling the filaments to their orientation temperature, enclosed in an essentially leak-proof hood member. Each set of filaments is contacted with and conveyed by a set of heated rollers whereby the filaments are gradually cooled to their orientation temperature. After each set of filaments has been adjusted to the orientation temperature, the filaments are subjected to tension forces so that the filaments now under tension are oriented or stretched, after which, while still under tension, they are passed through a cooling bath. The desired tension force is provided by means of a driven roll and idler arrangement described in detail hereinafter. As indicated heretofore, the sets of filaments from their respective baths are passed as families of parallel filaments to a point where they are mingled or mixed before going on the take-off means.

In order to obtain filaments of the desired diameter, size control means are provided. As will be described in detail hereinafter, the control of filament diameter may be effectuated by controlling the surface speed of the driven roll and the heated rollers with relation to the emergence rate from the extrusion dies.

In order to describe the invention more specifically reference is now made to the accompanying drawings illustrating one embodiment of apparatus for carrying out the process of this invention. The apparatus as shown is used in connection with the orienting and mixing of polystyrene mono-filaments of three different colors. It should be understood, however, that this apparatus could be used for orienting and mixing synthetic filaments of different materials.

As best shown in FIG. 1, three sets, $1^a$, $2^a$ and $3^a$, of extruded unoriented polystyrene filaments, which are red, yellow and black, respectively, emerge from extrusion dies 1, 2 and 3, respectively. Each of these sets $1^a$, $2^a$ and $3^a$ comprises a family of substantially parallel filaments which are gradually cooled to their orientation temperature as they are conveyed by heated motor driven rollers $1^b$, $2^b$ and $3^b$, respectively, to points A, B and C, respectively. At points A, B and C, respectively, the filaments of sets $1^a$, $2^a$ and $3^a$, respectively, are stretched or oriented due to the tensional pull exerted thereon forming sets $1^c$, $2^c$ and $3^c$ of oriented filaments. The sets $1^c$, $2^c$ and $3^c$ of oriented filaments pass around rollers 4, 5 and 6, respectively, into cooling baths 7, 8 and 9, respectively, whereby the path of movement of each set of filaments is reversed. From rollers 4, 5 and 6, respectively, the converging sets of oriented filaments $1^c$, $2^c$ and $3^c$ proceed over rolls 10, 11 and 12 and then over roll 13 where they mingle and are subsequently drawn together by an eye guide forming a band 15 of mixed oriented filaments.

Tensioning force is applied to band 15 by wrapping same around driven roll 16 and idler 17 several times before going through level winder guide 18 or 19 on to the final take-off reel 20 or 21 from which the band of filaments is cut in packageable hank form. The tension force applied to band 15 is transmitted to the unoriented filaments $1^a$, $2^a$ and $3^a$ at points A, B and C, causing them to stretch as described hereinbefore.

Variation of diameter size of the filaments of sets $1^c$, $2^c$ and $3^c$ is effectuated by a combination of varying the take-off speed at one set and varying the emergent speed at which the other sets emerge from their extrusion die heads. More particularly, in the embodiment shown, variation of diameter size is effectuated by controlling the surface speed of the driven roll 16 and the driven heated rollers $1^b$, $2^b$ and $3^b$. In this embodiment, the surface speed of the driven roll 16 is fixed with respect to the surface speed of the driven heated rollers $1^b$, $2^b$ and $3^b$ by means of a common chain drive (not shown). It is apparent that when driven roll 16 and driven heated rolls 3ᵇ, having a fixed surface speed or stretch ratio as for example, in the ratio in the order of 5:1 to 10:1, are speeded up or slowed down together in order to control the size of the black set of filaments 3ᶜ, the sizes of the set 1ᶜ of red filaments and the set 2ᶜ of yellow filaments would be varied. Accordingly, independent control of the size of the red filaments 1ᶜ and yellow filaments 2ᶜ is essential. The preferred method of controlling the size of red filaments 1ᶜ and yellow filaments 2ᶜ is to vary the speed of their extruder driver thereby increasing or decreasing the emergent rate of these filaments.

As indicated heretofore, the heated rollers 1ᵇ, 2ᵇ and 3ᵇ gradually cool the extruded monofilaments to their orientation temperature. Preferably, for each set of heated rollers an incremented roller temperature is used. Thus, for example in adjusting polystyrene monofilaments to their orientation temperature, the first roller to be contacted by the unoriented polystyrene filaments may be internally heated by steam to a temperature in the range of 210° and 240° F., and the remaining rollers of each set to a temperature in the range of 240°–330° F., preferably 240°–310° F.

The invention in its broader aspects is not limited to the specific steps, methods, combinations and improvements described but departures may be made therefrom within the scope of the accompanying claim without departing from the principles of the invention and without sacrificing its chief advantages.

What is claimed is:

A process for the simultaneous orientation and mixing of a plurality of dissimilar sets of extruded thermoplastic monofilaments, comprising independently extruding a plurality of dissimilar sets of thermoplastic monofilaments; causing each dissimilar set of monofilaments to be in frictional contact with separate roller surfaces, each dissimilar set of monofilaments-roller surface frictional contact being sufficient to prevent slippage of each dissimilar set of monofilaments on its roller surfaces when tensional force for orientation of each dissimilar set of monofilaments is subsequently applied; orienting each dissimilar set of monofilaments under the conditions required for each dissimilar set of monofilaments; and commingling the dissimilar sets of oriented monofilaments at a common tension applying location while the dissimilar sets of monofilaments are under the tensional conditions required for their respective orientation.

References Cited in the file of this patent

UNITED STATES PATENTS

| | | |
|---|---|---|
| 1,758,622 | Rindge | May 13, 1930 |
| 2,138,954 | Bouhuys | Dec. 6, 1938 |
| 2,139,449 | Karns | Dec. 6, 1938 |
| 2,262,872 | Whitehead | Nov. 18, 1941 |
| 2,321,635 | Taylor | June 15, 1943 |
| 2,323,383 | Dreyfus | July 6, 1943 |
| 2,328,074 | Hunter | Aug. 31, 1943 |
| 2,455,173 | Hitt | Nov. 30, 1948 |
| 2,697,851 | Haskel | Dec. 28, 1954 |
| 2,900,220 | Shaw | Aug. 18, 1959 |

FOREIGN PATENTS

| | | |
|---|---|---|
| 924,312 | France | Aug. 1, 1947 |

OTHER REFERENCES

Ser. No. 715,003, Wulff et al. (A.P.C.), published Apr. 27, 1948.